(12) United States Patent
Scott et al.

(10) Patent No.: US 9,073,145 B2
(45) Date of Patent: Jul. 7, 2015

(54) ELECTRIC INDUCTION IMPEDER

(75) Inventors: Paul F. Scott, Farmington, CT (US);
Michael A. Nallen, Old Saybrook, CT (US); Oleg S. Fishman, Maple Glen, PA (US); John H. Mortimer, Little Egg Harbor Township, NJ (US)

(73) Assignee: Inductotherm Corp., Rancocas, NJ (US)

( * ) Notice: Subject to any disclaimer, the term of this patent is extended or adjusted under 35 U.S.C. 154(b) by 0 days.

(21) Appl. No.: 13/608,188

(22) Filed: Sep. 10, 2012

(65) Prior Publication Data

US 2013/0001219 A1    Jan. 3, 2013

Related U.S. Application Data

(62) Division of application No. 12/471,451, filed on May 25, 2009, now Pat. No. 8,263,915, which is a division of application No. 11/303,694, filed on Dec. 16, 2005, now abandoned.

(60) Provisional application No. 60/637,590, filed on Dec. 20, 2004.

(51) Int. Cl.
*B23K 13/02* (2006.01)

(52) U.S. Cl.
CPC .......... *B23K 13/025* (2013.01); *B23K 2201/06* (2013.01)

(58) Field of Classification Search
CPC ............................... H05B 6/365; B23K 13/02
USPC ......... 219/613, 612, 617, 651, 672, 673, 632, 219/61.7, 61.1, 61.3, 59.1; 252/62.54; 156/272.2, 283

See application file for complete search history.

(56) References Cited

U.S. PATENT DOCUMENTS

| | | | | |
|---|---|---|---|---|
| 4,207,550 A * | 6/1980 | Daikoku et al. | ................. | 336/60 |
| 4,608,471 A * | 8/1986 | Vollmuth et al. | ............. | 219/613 |
| 4,818,833 A * | 4/1989 | Formanack et al. | .......... | 219/634 |
| 5,508,672 A * | 4/1996 | Sokai | ................ | 336/57 |
| 2002/0180284 A1 * | 12/2002 | LeFlem et al. | .................. | 310/54 |

FOREIGN PATENT DOCUMENTS

JP    60258414 A    * 12/1985

* cited by examiner

*Primary Examiner* — Quang Van
(74) *Attorney, Agent, or Firm* — Philip O. Post

(57) ABSTRACT

An impeder for use in an electric induction welding process is provided. A cooling medium is circulated around the exterior of the impeder's magnetic material with the impeder entry and exit passages for the cooling medium located on opposite sides of the impeder.

13 Claims, 3 Drawing Sheets

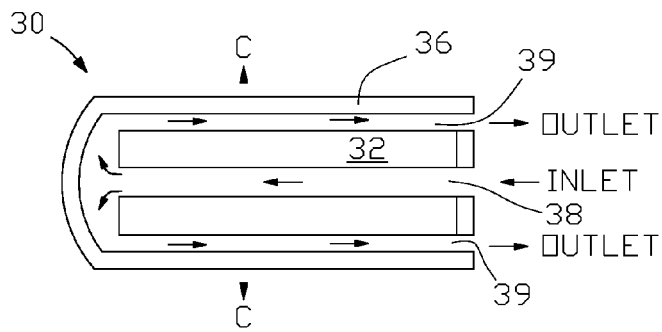
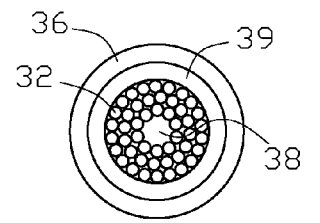
FIG. 3(a)  FIG. 3(b)
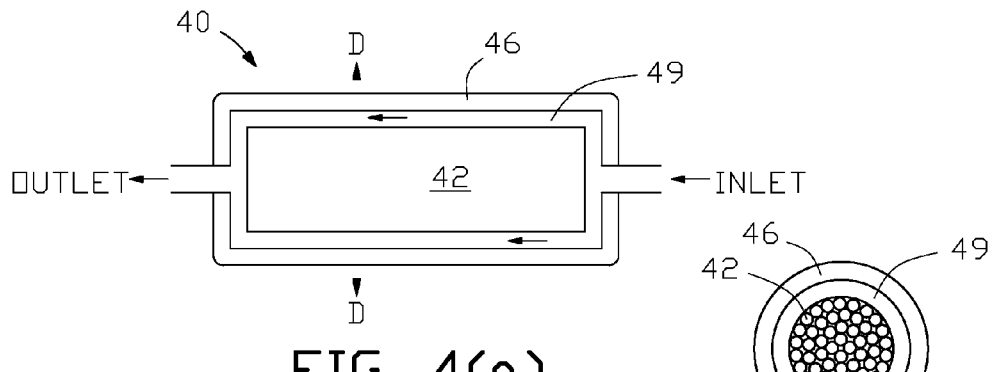
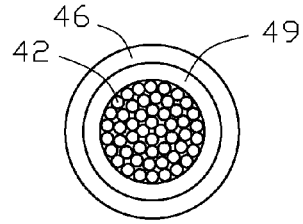
FIG. 4(a)  FIG. 4(b)
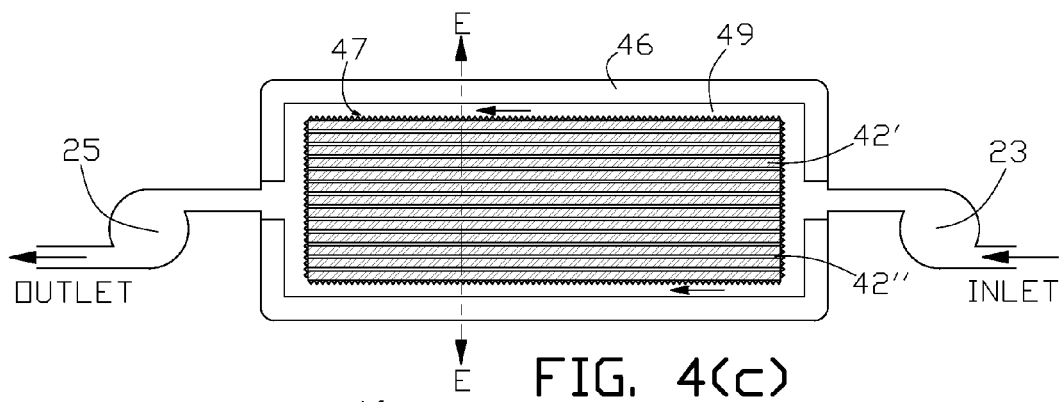
FIG. 4(c)
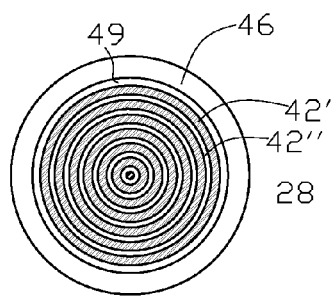
FIG. 4(d)

ELECTRIC INDUCTION IMPEDER

CROSS REFERENCE TO RELATED APPLICATIONS

This is a divisional application of application Ser. No. 12/471,451, filed May 25, 2009, which is a divisional application of application Ser. No. 11/303,694, filed Dec. 16, 2005, which application claims the benefit of U.S. Provisional Application No. 60/637,590, filed Dec. 20, 2004, all of which applications are hereby incorporated herein by reference in their entireties.

FIELD OF THE INVENTION

The present invention relates to impeders that can be used in electric induction welding processes to form, for example, metal pipe or tubing from strip stock.

BACKGROUND OF THE INVENTION

Impeders are used in high frequency welded pipe and tube fabrication processes. They are one or more pieces of ferrite, or other magnetic material, that is placed inside a pipe or tube within the weld area. This magnetic material accomplishes two things. It increases the electrical impedance of the inside current path of the tube, forcing the current to flow on the vee edges of the tube instead. It is this current that heats the vee edges prior to forging them together in the weld box. Secondly, it creates a low magnetic reluctance path inside the tube between the apex of the weld vee and the rear of the tube. The lower reluctance path becomes the preferred path for the magnetic field. Thus more of the magnetic field generated by the tube welder's induction coil or contacts passes through the weld vee to utilize this preferred path, and the welding current induced on the vee edges is thereby increased. U.S. Pat. No. 4,443,677 further describes the induction welding process and one type of conventional impeders.

There are many practical problems encountered with conventional impeders. The magnetic field that the impeder carries causes losses in the ferrite due to its finite resistivity and its coercivity. These losses heat the ferrite, and if heat is not removed through proper cooling, the ferrite's Curie temperature (the temperature at which a material looses its magnetic properties) can be exceeded or the binder that holds the ferrite material together can disintegrate. Ferrite is a brittle material and mechanical shock encountered during the tube fabrication processes can cause it to break into multiple pieces. When this happens the effective magnetic properties are greatly reduced. The ferrite is usually enclosed in a jacket generally made from a fiberglass type material. This helps protect the ferrite from mechanical shock and provides a means for channeling cooling water to the ferrite. When fabricating smaller diameter tube, the diameter of the ferrite must be as large as possible so that the impeder does not magnetically saturate. This results in tight clearances between the ferrite and the casing. Thus the cooling water must not contain contaminants that can plug the coolant passage between the ferrite and its casing. When this happens, the ferrite will fail almost immediately due to local over-heating. Temporary interruptions in the coolant supply can cause steam to develop inside the impeder casing. When this happens, the ferrite can temporarily exceed its Curie temperature and this can result in a section of "cold" or paste weld in the tube.

An object of the present invention is to provide an impeder with internal cooling that operates with improved efficiency.

BRIEF SUMMARY OF THE INVENTION

In one aspect, the present invention is apparatus for, and method of, electric induction welding with an impeder. The impeder is formed from a high temperature impeder element disposed in a high temperature enclosure. The impeder element may be a plurality of solid wires formed from a magnetically conductive, high Curie temperature material, with each of the wires electrically isolated from all other wires. The high temperature enclosure may be formed from a suitable ceramic composition. Internal cooling may be via a closed or open cooling system where the cooling medium is circulated around the exterior of the impeder element with entry and exit passages for the cooling medium on opposite sides of the impeder. In alternate examples of the invention the impeder element may be a ferrite, or a rolled magnetically conductive sheet.

Other aspects of the invention are set forth in this specification and the appended claims.

BRIEF DESCRIPTION OF THE DRAWINGS

The foregoing brief summary, as well as the following detailed description of the invention, is better understood when read in conjunction with the appended drawings. For the purpose of illustrating the invention, there is shown in the drawings exemplary forms of the invention that are presently preferred; however, the invention is not limited to the specific arrangements and instrumentalities disclosed in the following appended drawings:

FIG. 3(a) is a longitudinal cross sectional view of another example of an impeder of the present invention with internal cooling.

FIG. 3(b) is a cross sectional view of the impeder in FIG. 3(a) along the line C-C.

FIG. 4(a) is a longitudinal cross sectional view of another example of an impeder of the present invention with internal cooling.

FIG. 4(b) is a cross sectional view of the impeder in FIG. 4(a) along the line D-D.

FIG. 4(c) is a longitudinal cross sectional view of another example of an impeder of the present invention with internal cooling.

FIG. 4(d) is a cross sectional view of the impeder in FIG. 4(c) along the line E-E.

DETAILED DESCRIPTION OF THE INVENTION

Figure 1A:
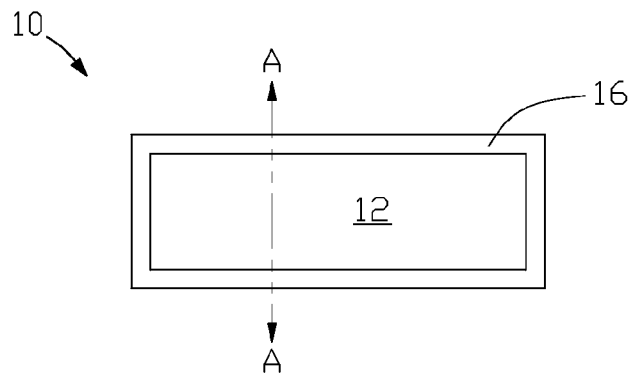
FIG. 1(a) is a longitudinal cross sectional view of one example of an impeder of the present invention that does not require internal cooling.
Figure 1B:
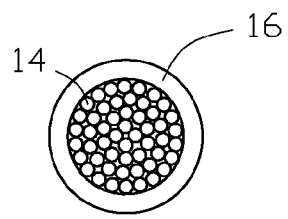
FIG. 1(b) is a cross sectional view of the impeder in FIG. 1(a) along the line A-A.

Referring now to the drawings, wherein like numerals indicate like elements, there is shown in FIG. 1(a) and FIG. 1(b) a first example of the impeder 10 of the present invention. The impeder element 12 comprises a bundle of high temperature solid wires 14 substantially surrounded by a high temperature enclosure 16. In this non-limiting example of the invention the high temperature solid wires are formed from a suitable type of high Curie temperature magnetic material, such as but not limited to, a class of iron-cobalt alloys known as permendur to form a cylindrical bundle. The term "high Curie temperature" as used herein generally refers to a Curie temperature of approximately 235° C. or higher. Each wire is electrically isolated from each of the other wires by means of a suitable insulation that may be formed by an oxidation process on the surface of each wire, or by any other suitable method. The term "high temperature enclosure" as used herein generally refers to an enclosure material capable of withstanding approximately 200° C., or higher, depending upon a particular application, and may be formed from a suitable heat resistant material such as a ceramic composition. One non-limiting type of ceramic composition that may be used for the enclosure is a silicon-aluminum-oxynitride composition known as sialon. Alternatively a synthetic high temperature polymer, such as a polyaramid polyparaphenylene terephthalamide composition, for example, in the form of a KEVLAR tape, may be used to form the enclosure. The enclosure may be cast around the plurality of wires used in impeder 10. While the impeder in FIG. 1(a) and FIG. 1(b) has a generally overall cylindrical shape, other shapes are suitable depending upon a particular application. The term "wire" as used herein generally refers to a magnetically conductive material, which may be of any cross sectional shape, and have with a cross section, typically (but not limited to) between 8 and 24 American Wire Gauge (AWG). Wires of different compositions may be used in other examples of the inventions, and the enclosure may be formed from multiple parts of different high temperature material.

Figure 2A:
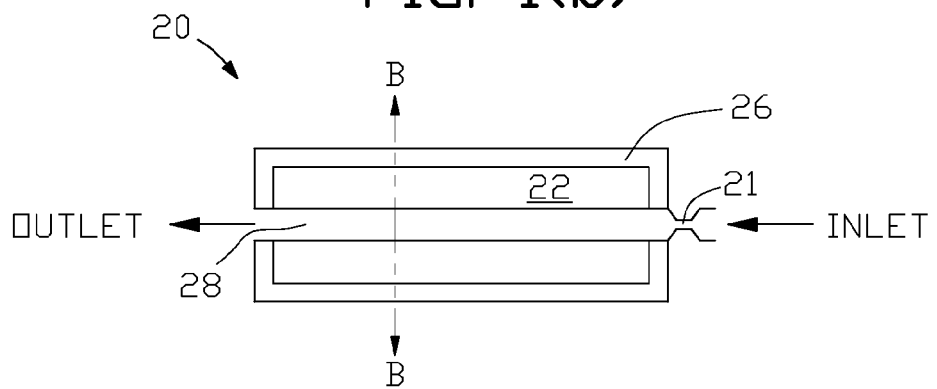
FIG. 2(a) is a longitudinal cross sectional view of one example of an impeder of the present invention with internal cooling.
Figure 2B:
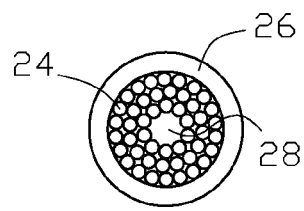
FIG. 2(b) is a cross sectional view of the impeder in FIG. 2(a) along the line B-B.

FIG. 2(a) and FIG. 2(b) illustrate a second example of the impeder 20 of the present invention. In this example, the impeder element 22 comprises a cylindrical ring of high temperature solid wires 24 that is enclosed in a high temperature enclosure 26. Non-limiting selection of the high temperature solid wires and enclosure is the same as that described above for the first example of the invention. Center passage 28 is formed in the cylindrical ring of wires and provides a flow path for a cooling medium, such as but not limited to air, water or liquid nitrogen. Flow is from the INLET to the OUTLET as illustrated by the arrows in FIG. 2(a). A venturi element 21 can be optionally placed at the inlet of the center passage to enhance the cooling effect of the cooling medium. While the impeder 20 in FIG. 2(a) and FIG. 2(b) has a generally overall cylindrical shape, other shapes are suitable depending upon a particular application. The ring of high temperature wires, for example, may be of rectangular shape in cross section with a suitable passage formed with the plurality of wires for the flow of a cooling medium. More than one inlet or outlet ports may be provided depending upon a particular application. In other examples of the invention more than one passage may be provided through the impeder element.

FIG. 3(a) and FIG. 3(b) illustrate a third example of the impeder 30 of the present invention wherein a closed loop cooling system is used. In this example, the impeder element 32 comprises a magnetic material that is enclosed within a high temperature enclosure 36. The magnetic material is in the shape of an open cylinder. The magnetic material may be any suitable magnetic material such as a ferrite or the high temperature wires described above, and the high temperature enclosure may be a ceramic composition as described above. Center passage 38 provides a flow path for a cooling medium through the impeder from the inlet, and can generally be referred to as a coolant entry passage. More than one coolant entry passages may be provided in other examples of the invention. Annular region 39 forms a space between the inner wall of the enclosure and the magnetic material to provide a flow path around the impeder to the outlet, and can generally be referred to as a coolant exit passage. Coolant flow through the impeder is as illustrated by the arrows in FIG. 3(a). In other examples of the invention the coolant exit passage may be provided with one or more passage walls that selectively direct flow around the space between the inner wall of the enclosure and the magnetic material. More than one inlet or outlet ports may be provided depending upon a particular application. As in the second example of the invention a venturi element can be optionally placed at the inlet to enhance cooling around the impeder.

FIG. 4(a) and FIG. 4(b) illustrate a fourth example of the impeder 40 of the present invention which is similar to the third example above except that the cooling medium is provided in an open cooling system wherein the cooling medium enters at the inlet and flows around impeder element 42 through annular passage 49 to exit out the outlet as indicated by the arrows in FIG. 4(a). Generally an open loop system is used when the cooling medium can also serve as the mill coolant, which is used to wash away oils, oxides, slivers, and dirt generated during mill processes. Alternatively the impeder element may be in the shape of an open ring and the cooling medium will flow through the center passage of the ring. Impeder element 42 may be any suitable magnetic material such as a ferrite or the high temperature wires described above, and high temperature enclosure 46 may be a ceramic composition as described above.

In all examples of the invention the impeder element may be a sheet of high Curie temperature magnetic material, such as but not limited to permendur, that is rolled to form a generally cylindrical shape such as rolled sheet 42' (shown crosshatched) in FIG. 4(c) and FIG. 4(d). Adjacent surfaces of the rolled material are electrically insulated from each other by any suitable method, including but not limited to an oxidation process such as insulation 42" as shown in FIG. 4(c) and FIG. 4(d). In examples of the invention wherein the impeder is internally cooled with a cooling medium, the sheet can be rolled with a bobbin or one or more removal spindles to form one or more coolant passages within the impeder element. Suitable but not limiting thickness of the sheet is in the range of the diameters stated above for the high temperature wires used in other examples of the invention.

Figure 5:
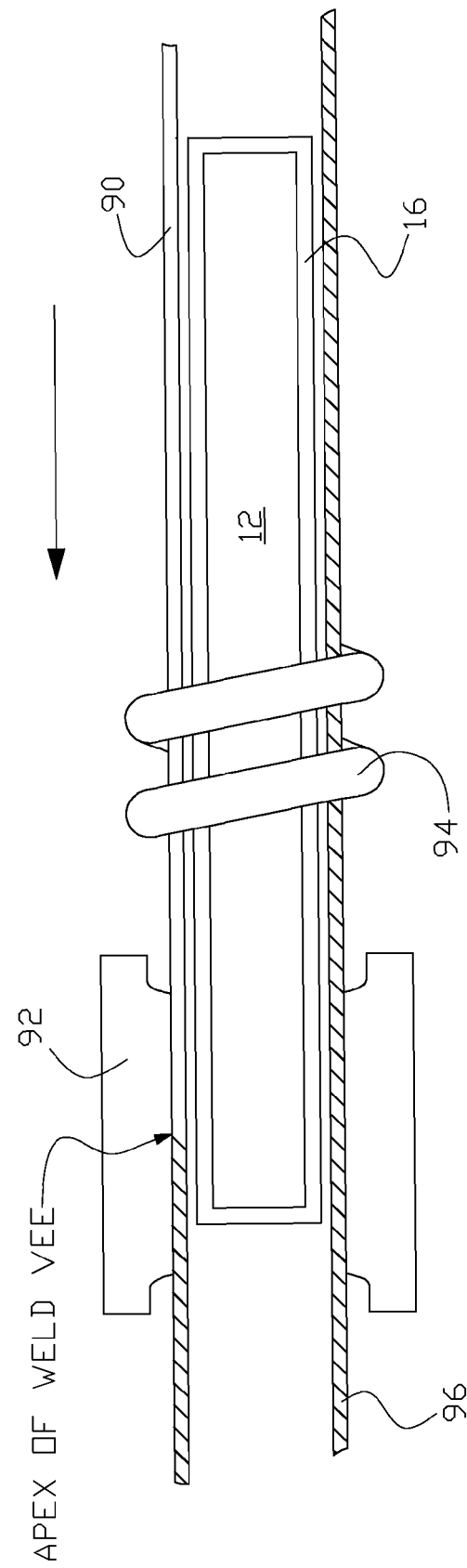
FIG. 5 is a cross sectional simplified illustration of an arrangement for an induction welding process wherein an impeder of the present invention is used.

FIG. 5 illustrates one example of use of an impeder of the present invention in an electric induction welding process. Stock material 90, which may be a metal sheet, is driven through weld box 92 in the direction indicated by the arrow to bring opposing edges of the stock material together. AC current flowing through induction coil 94, which surrounds the stock material, creates a magnetic field that couples with the stock material. Induced currents in the stock material weld the opposing edges of the stock material together as they pass through the weld box to form a product 96, such as a tube or pipe. An impeder of the present invention, for example impeder 10 shown in FIG. 1(a) and FIG. 1(b), is inserted into the stock material generally in the region shown in FIG. 5.

In all examples of the invention wherein a cooling medium is used, a coolant with a high heat capacity, such as an oil-based coolant can be used to reduce the flow and pressure requirements for the cooling system. Using a return flow type impeder casing design such as that illustrated in FIG. 3(a) and FIG. 3(b) with pumps at both the inlet and outlet would allow the outlet pressure to be below atmospheric, or as also illustrated in FIG. 4(c) with inlet cooling medium pump 23 and outlet cooling medium pump 25. Attaching a short hose through a one-way valve to the outlet side of the impeder would allow the system to remove any excess mill coolant from inside the welded tube. Excess mill coolant inside the tube can cause steam blowback through the weld vee, if it is heated by a subsequent steam annealing process. Additionally an advanced filtration system can be used to remove all contaminants from the impeder coolant and thereby eliminate any cooling passage clogging problem. A refrigeration system can be used to remove the heat from the coolant and control its inlet temperature at just below the optimal temperature that maximizes the magnetic properties of the impeder. By applying a thermally designed texture 47 to the outside surface of the impeder as shown, for example, in FIG. 4(c), the laminar boundary layer can be eliminated thereby greatly increasing the heat transfer between the ferrite and the coolant. The term "thermally designed texture" as used herein refers to any method of configuring the surface wall or boundary of the magnetic material, when that wall or boundary is used as a boundary for the cooling medium passage, to reduce laminar boundary flow conditions from those existing when the wall or boundary is substantially smooth, including application of a boundary wall texturing material over the magnetic material.

In all examples of the invention an optional inside cushioning liner can be disposed between the high temperature enclosure and the impeder to reduce shock transfer to the impeder material, which can extend the life of the impeder. The inside of the casing or the liner can be molded with cooling passages and/or a special texture to create turbulence in the coolant and thereby increasing the heat transfer between the ferrite and the coolant.

If a ferrite is used as the impeder, the ferrite composition can be optimized for high Curie temperature, and low coercivity and resistive losses to integrate it with the cooling system and coolant employed. High temperature binder, possibly ceramic based, can be used to prevent binder disintegration.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. An impeder for controlling a magnetic field path in a workpiece in an electric induction welding process, the impeder comprising:
    a magnetic material comprising a plurality of magnetically conductive, high Curie temperature solid wires assembled in a bundle, each of the plurality of wires electrically isolated from each other, the magnetic material having a longitudinal exterior boundary and a first end exterior boundary of a first magnetic material end and a second end exterior boundary of a second magnetic material end, the first magnetic material end opposing the second magnetic material end; and
    a high temperature enclosure having a longitudinal interior boundary and a first enclosure end interior boundary of a first enclosure end and a second enclosure end interior boundary of a second enclosure end, the first enclosure end interior boundary opposing the second enclosure end interior boundary, the first enclosure end interior boundary facing the first end exterior boundary of the magnetic material, and the second enclosure end interior boundary facing the second end exterior boundary of the magnetic material, the longitudinal exterior boundary and the first and second end exterior boundaries of the magnetic material respectively spaced apart from the longitudinal interior boundary and the first and second enclosure end interior boundaries of the high temperature enclosure to form a continuous internal coolant flow passage in the impeder, the high temperature enclosure having at least one inlet port in the first enclosure end for injecting a cooling medium into the continuous internal coolant flow passage and at least one outlet port in the second enclosure end for discharging the cooling medium from the continuous internal coolant flow passage, the at least one inlet port axially aligned with the at least one outlet port.

2. The impeder of claim 1 wherein at least a part of the high temperature enclosure is formed from a sialon.

3. The impeder of claim 1 wherein at least part of the high temperature enclosure comprises polyaramid polyparaphenylene terephthalamide.

4. The impeder of claim 1 further comprising a means for directing the cooling medium from the at least one outlet port to remove an excess mill coolant from the workpiece.

5. The impeder of claim 1 further comprising a thermal texture on the longitudinal exterior boundary and the first and second end exterior boundaries of the magnetic material.

6. The impeder of claim 1 further comprising an inlet cooling medium pump at the at least one inlet port and an outlet cooling medium pump at the at least one exit port to provide a cooling medium pressure below atmospheric pressure at the at least one exit port.

7. An impeder for controlling a magnetic field path in a workpiece in an electric induction welding process, the impeder comprising:
    a plurality of magnetically conductive, high Curie temperature solid wires assembled in a bundle, the bundle having a longitudinal exterior boundary and a first end exterior boundary of a first bundle end and a second end exterior boundary of a second bundle end, the first bundle end opposing the second bundle end;
    a high temperature enclosure having a longitudinal interior boundary and a first enclosure end interior boundary of a first enclosure end and a second enclosure end interior boundary of a second enclosure end, the first enclosure end interior boundary opposing the second enclosure end interior boundary, the first enclosure end interior boundary facing the first end exterior boundary of the bundle, and the second enclosure end interior boundary facing the second end exterior boundary of the bundle, the longitudinal exterior boundary and the first and second end exterior boundaries of the bundle respectively spaced apart from the longitudinal interior boundary and the first and second enclosure end interior boundaries of the high temperature enclosure to form a continuous internal coolant flow passage in the impeder, the high temperature enclosure having at least one inlet port in the first enclosure end for injecting a cooling medium into the continuous internal coolant flow passage and at least one outlet port in the second enclosure end for discharging the cooling medium from the continuous internal coolant flow passage, the at least one inlet port axially aligned with the at least one outlet port; and an inlet cooling medium pump at the at least one inlet port and an outlet cooling medium pump at the at least one exit port to provide a cooling medium pressure below atmospheric pressure at the at least one exit port.

8. The impeder of claim 7 further comprising a means for directing the cooling medium from the at least one outlet port to remove an excess mill coolant from the workpiece.

9. The impeder of claim 7 further comprising a thermal texture on the longitudinal exterior boundary and the first and second end exterior boundaries of the bundle.

10. An impeder for controlling a magnetic field path in a workpiece in an electric induction welding process, the impeder comprising:

a rolled sheet of a magnetically conductive, high Curie temperature material having adjacent surfaces of the rolled sheet electrically isolated from each other, the rolled sheet having a longitudinal exterior boundary and a first end exterior boundary of a first rolled sheet end and a second end exterior boundary of a second rolled sheet end, the first rolled sheet end opposing the second rolled sheet end; and a high temperature enclosure having a longitudinal interior boundary and a first enclosure end interior boundary of a first enclosure end and a second enclosure end interior boundary of a second enclosure end, the first enclosure end interior boundary opposing the second enclosure end interior boundary, the first enclosure end interior boundary facing the first end exterior boundary of the rolled sheet, and the second enclosure end interior boundary facing the second end exterior boundary of the rolled sheet, the longitudinal exterior boundary and the first and second end exterior boundaries of the rolled sheet respectively spaced apart from the longitudinal interior boundary and the first and second enclosure end interior boundaries of the high temperature enclosure to form a continuous internal coolant flow passage in the impeder, the high temperature enclosure having at least one inlet port in the first enclosure end for injecting a cooling medium into the continuous internal coolant flow passage and at least one outlet port in the second enclosure end for discharging the cooling medium from the continuous internal coolant flow passage.

11. The impeder of claim 10 further comprising a means for directing the cooling medium from the at least one outlet port to remove an excess mill coolant from the workpiece.

12. The impeder of claim 10 further comprising a thermal texture on the longitudinal exterior boundary and the first and second end exterior boundaries of the rolled sheet.

13. The impeder of claim 10 further comprising an inlet cooling medium pump at the at least one inlet port and an outlet cooling medium pump at the at least one exit port to provide a cooling medium pressure below atmospheric pressure at the at least one exit port.

* * * * *